US010445566B2

United States Patent
Sashida et al.

(10) Patent No.: US 10,445,566 B2
(45) Date of Patent: Oct. 15, 2019

(54) IMAGE PROCESSING APPARATUS, IMAGE PROCESSING METHOD, AND NON-TRANSITORY RECORDING MEDIUM STORING COMPUTER READABLE PROGRAM

(71) Applicant: KONICA MINOLTA, INC., Chiyoda-ku (JP)

(72) Inventors: Takehiko Sashida, Setagaya-ku (JP); Yuta Kudo, Nerima-ku (JP); Yoshimitsu Aoki, Tama (JP)

(73) Assignee: Konica Minolta, Inc., Tokyo (JP)

( * ) Notice: Subject to any disclaimer, the term of this patent is extended or adjusted under 35 U.S.C. 154(b) by 354 days.

(21) Appl. No.: 15/123,235

(22) PCT Filed: Jan. 7, 2015

(86) PCT No.: PCT/JP2015/050222
§ 371 (c)(1),
(2) Date: Sep. 1, 2016

(87) PCT Pub. No.: WO2015/133159
PCT Pub. Date: Sep. 11, 2015

(65) Prior Publication Data
US 2017/0076148 A1 Mar. 16, 2017

(30) Foreign Application Priority Data
Mar. 5, 2014 (JP) .................. 2014-042929

(51) Int. Cl.
*G06K 9/00* (2006.01)
(52) U.S. Cl.
CPC ..... *G06K 9/00342* (2013.01); *G06K 9/00248* (2013.01); *G06K 9/00268* (2013.01); *G06K 9/00369* (2013.01); *G06K 9/00771* (2013.01)

(58) Field of Classification Search
CPC .................. G06K 9/00248; G06K 9/00268
See application file for complete search history.

(56) References Cited

U.S. PATENT DOCUMENTS 9,319,632 B2 * 4/2016 Kim .................. H04N 7/15
9,538,158 B1 * 1/2017 Rush .................. A61B 5/002
(Continued)

FOREIGN PATENT DOCUMENTS

JP     9-139936     5/1997
JP     2006-254321     9/2006
(Continued)

OTHER PUBLICATIONS

Kiyoshi Hashimoto, et al., "Multi-human Tracking with Main-Parts-Link-Model Considering Postural Change", IPSJ SIG Technical Report vol. 2011-CVIM-177 No. 19, May 19, 2011.
(Continued)

*Primary Examiner* — Edward Park
(74) *Attorney, Agent, or Firm* — Cozen O'Connor

(57) ABSTRACT

Image processing apparatus capable of detecting a person independently of the positional relationship between a camera and the person. The image processing apparatus (100) detects a human region included in an input image. The image processing apparatus (100) includes: head detection unit (210) for detecting head position of a person in an input image; determination unit (220) for determining a relative positional relationship between the head and another body part in the input image with use of feature amounts extracted from an image region around the head position detected by head detection unit (210); and human detection unit (230) for setting at least one of the direction of searching for a human region and the region of searching for the human
(Continued)

region in accordance with a relative relation determined by determination unit (220), and detecting the human region from the input image.

20 Claims, 15 Drawing Sheets

(56) References Cited

U.S. PATENT DOCUMENTS

| | | | | |
|---|---|---|---|---|
| 2006/0104480 A1* | 5/2006 | Fleisher | ............... | G01S 13/89 |
| | | | | 382/103 |
| 2006/0291694 A1* | 12/2006 | Venetianer | ......... | G06K 9/00369 |
| | | | | 382/103 |
| 2007/0165931 A1* | 7/2007 | Higaki | ............... | G06K 9/00201 |
| | | | | 382/128 |
| 2012/0169887 A1* | 7/2012 | Zhu | ................. | G06K 9/00335 |
| | | | | 348/207.1 |

FOREIGN PATENT DOCUMENTS

| | | |
|---|---|---|
| JP | 2009-26146 | 2/2009 |
| JP | 2013-54739 | 3/2013 |

OTHER PUBLICATIONS

Ching-WeiWang and Andrew Hunter, "Robust Pose Recognition of the Obscured Human Body," Int J Comput Vis (2010) 90: 313-330, DOI 10.1007/s11263-010-0365-3.
Office Action dated May 10, 2018 which issued in the corresponding Japanese Patent Application No. 2016-506153.

* cited by examiner

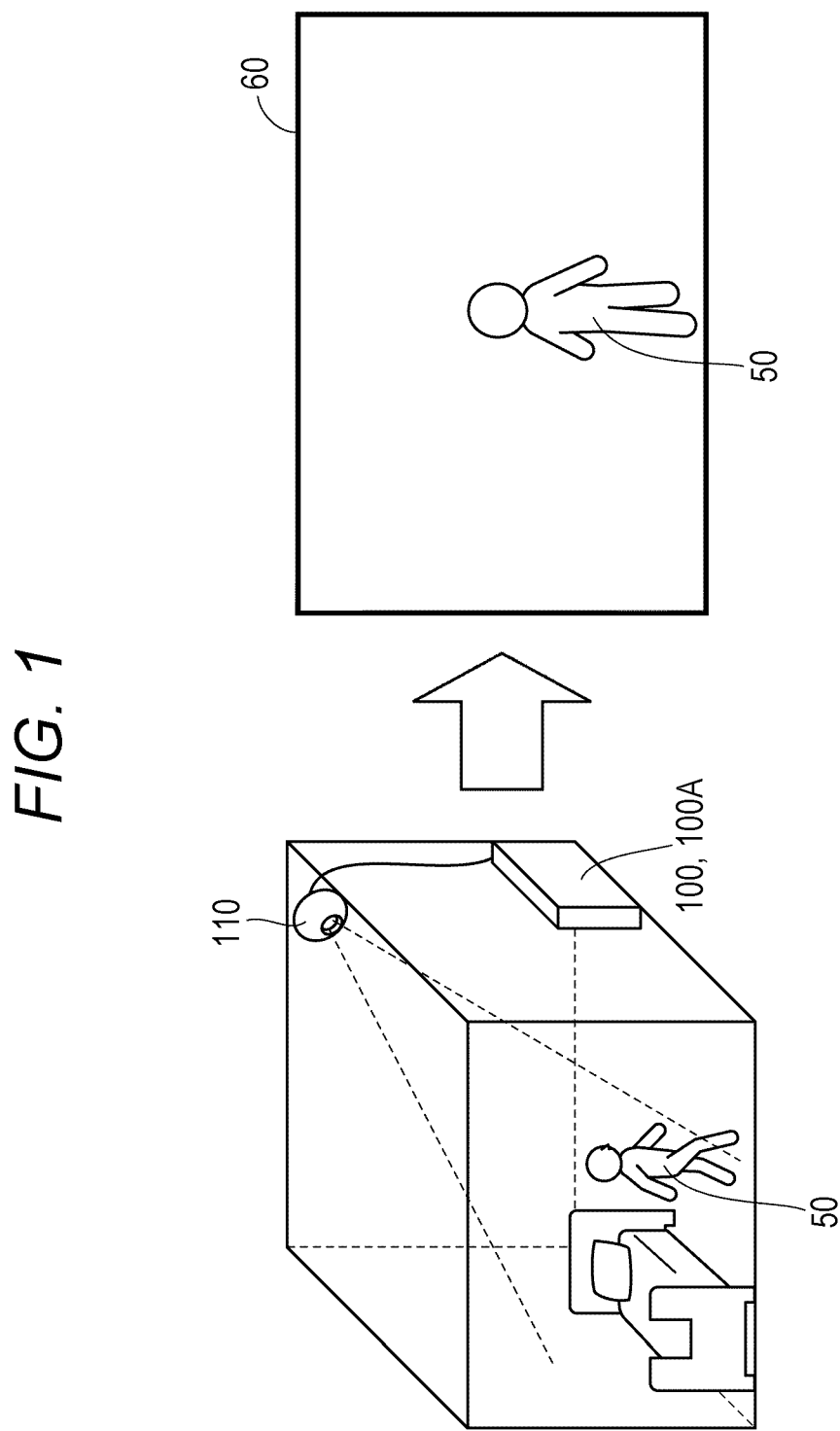

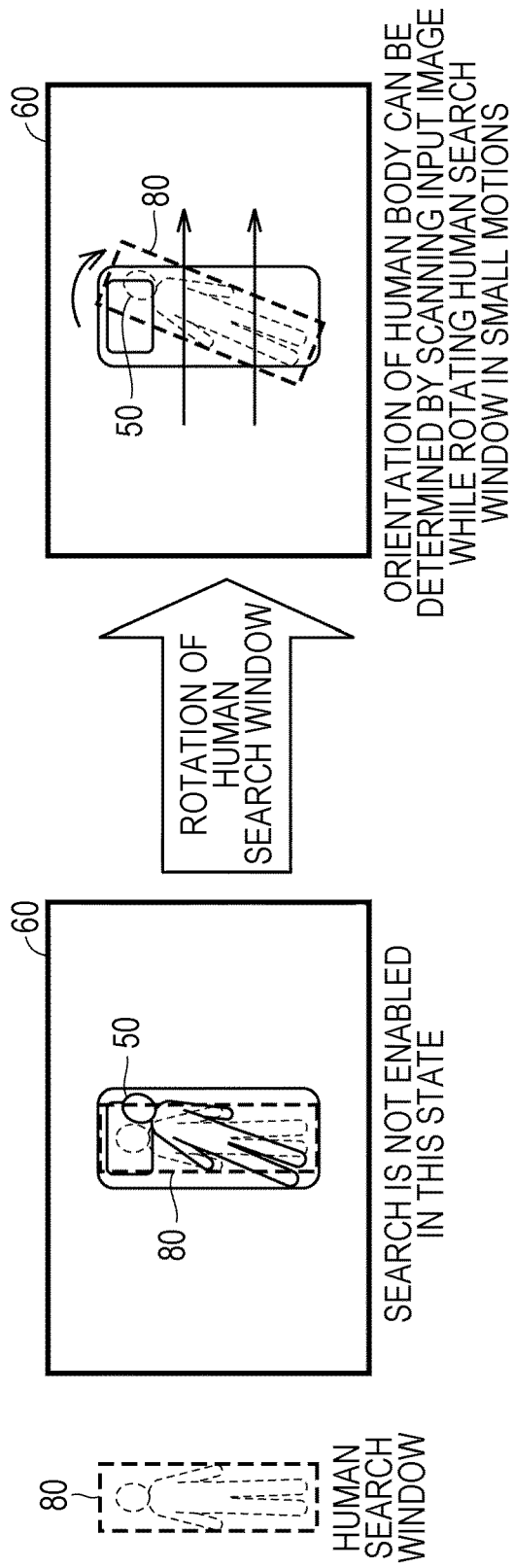

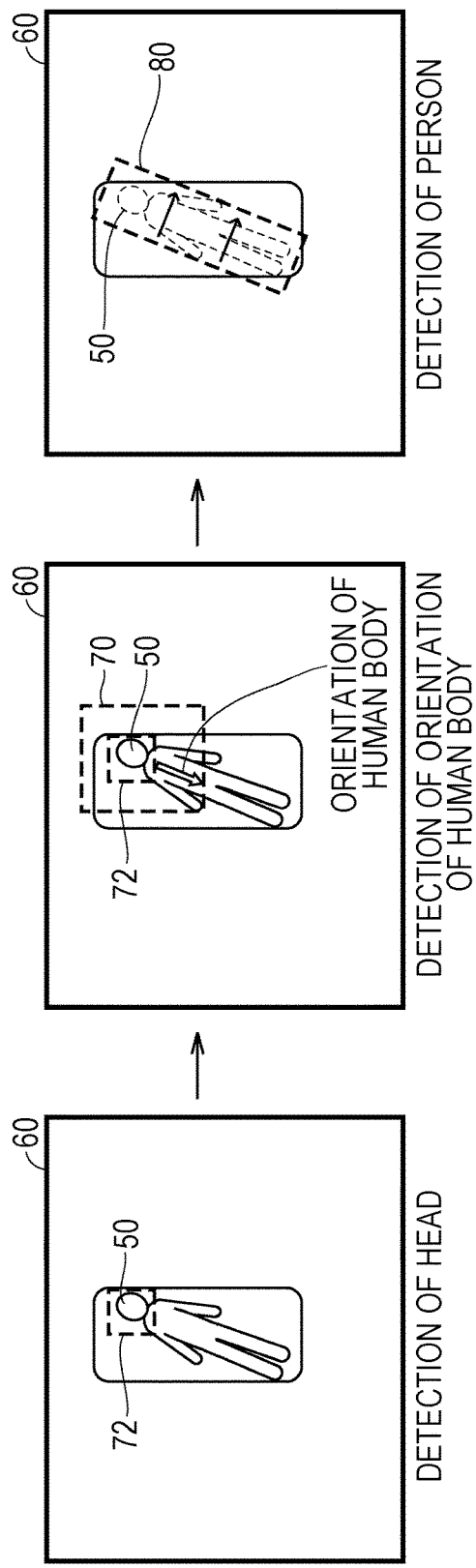

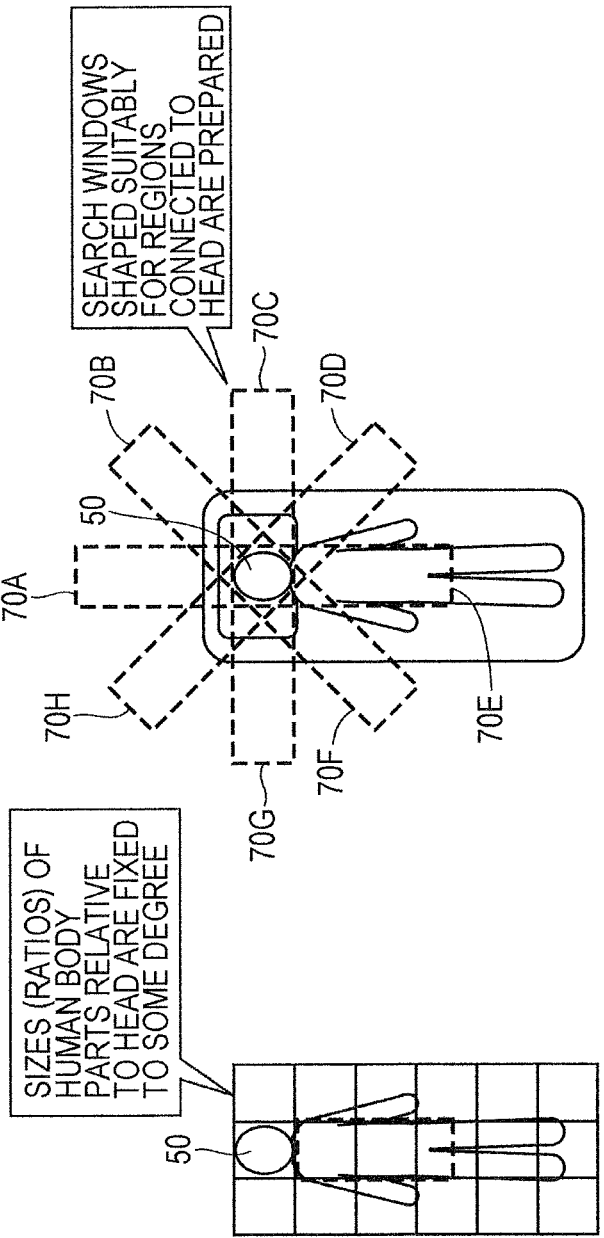

VARIATIONS IN MAGNIFICATION RATIO AND BODY SHAPE CAN BE HANDLED WITH BY CHANGING SIZE OF TRUNK SEARCH WINDOW WITH REFERENCE TO HEAD

⌐ ⌐ : TRUNK SEARCH WINDOW

IMAGE PROCESSING APPARATUS, IMAGE PROCESSING METHOD, AND NON-TRANSITORY RECORDING MEDIUM STORING COMPUTER READABLE PROGRAM

RELATED APPLICATIONS

This is a U.S. National Phase Application under 35 USC 371 of International Application PCT/JP2015/050222 filed on Jan. 7, 2015.

This application claims the priority of Japanese application no. 2014-042929 filed Mar. 5, 2014, the entire content of which is hereby incorporated by reference.

TECHNICAL FIELD

The present disclosure relates to an image processing apparatus, an image processing method, and a non-transitory recording medium storing a computer readable program that allow detection of a person from an input image.

BACKGROUND ART

In the field of image processing, conventionally, there has been developed a technique for detecting a person from an image. The technique for detecting a person from an image is applied to various apparatuses including security cameras for detection abnormalities such as intrusion of a person, watching cameras for detection of a person falling down at care facilities or the like, form analyzer with sports video, other image processing apparatuses. However, most of these image processing apparatuses are produced on the precondition that images from cameras installed on the ceiling or the pillars are analyzed. That is, these image processing apparatuses detect a person on the assumption that the person is seen in a predetermined orientation so as not to increase a processing time.

For example, Non Patent Literature 1 discloses a technique for detecting a standing person from an input image obtained by shooting the person in a predetermined orientation. In addition, Non Patent Literature 2 discloses a technique for detecting a lying person from an input image obtained by shooting the person in a predetermined orientation.

CITATION LIST

Non Patent Literature

Non Patent Literature 1: Kiyoshi Hashimoto, Tomoyuki Kagaya, Hirokatsu Kataoka, Yuji Sato, Masamoto Tanabiki, Kyoko Oshima, Mitsuko Fujita, Yoshimitsu Aoki, "Multi-human Tracking with Main-Parts-Link-Model Considering Postural Change," Information Processing Society of Japan Technical Reports, 2011-CVIM-177(19)

Non Patent Literature 2: Ching-WeiWang, Andrew Hunter, "Robust Pose Recognition of the Obscured Human Body," International Journal of Computer Vision December 2010, Volume90, Issue3, p 313-330, Graduate Institute of Biomedical Engineering, National Taiwan University of Science and Technology

SUMMARY OF INVENTION

Technical Problem

According to the technique disclosed in Non Patent Literature 1, only a person seen in the predetermined orientation can be detected, and the installation position of the camera relative to the position of the person is limited. The same thing can be said to the technique disclosed in Non Patent Literature 2. Consequently, the conventional image processing techniques for human detection allow only the detection of a person seen in a specific orientation in an input image.

The present disclosure has been devised to solve the foregoing problem, and an object of an aspect of the present disclosure is to provide an image processing apparatus that allows detection of a person independently of the positional relationship between the camera and the person while suppressing increase in the processing time.

Solution to Problem

According to one embodiment, there is provided an image processing apparatus for detecting a human region included in an input image from the input image. The image processing apparatus includes: a head detection unit for detecting a position of a head of a person in an input image; a determination unit for determining a relative positional relationship between the head and another body part in the input image with the use of feature amounts extracted from an image region around the position of the head detected by the head detection unit; and a human detection unit for setting at least one of the direction of searching for a human region and the region of searching for the human region in accordance with a relative relation determined by the determination unit, and detecting the human region from the input image.

According to another embodiment, there is provided an image processing method to be executed by a computer for detecting a human region included in an input image from the input image. The image processing method includes: detecting a position of a head of a person in an input image; determining a relative positional relationship between the head and another body part in the input image with the use of feature amounts extracted from an image region around the position of the head; and setting at least one of the direction of searching for a human region and the region of searching for the human region depending on the relative positional relationship, and detecting the human region in the input image.

According to still another embodiment, there is provided a non-transitory recording medium storing a computer readable program for detecting a human region included in an input image from the input image. The non-transitory recording medium storing a computer readable program causes a computer to execute: detecting a position of a head of a person in an input image; determining a relative positional relationship between the head and another body part in the input image with the use of feature amounts extracted from an image region around the position of the head; and setting at least one of the direction of searching for a human region and the region of searching for the human region depending on the relative positional relationship, and detecting the human region in the input image.

BRIEF DESCRIPTION OF DRAWINGS

FIG. 1 is a diagram illustrating the state in which a camera connected to an image processing apparatus according to a first embodiment is shooting a subject.

FIG. 3 is a conceptual diagram schematically illustrating a human detection process according to a related art.

FIG. 4 is a conceptual diagram schematically illustrating a human detection process by an image processing apparatus according to the first embodiment.

FIG. 14 is a conceptual diagram schematically illustrating a process for deciding the shape of a trunk search window depending on the position of the head.

DESCRIPTION OF EMBODIMENTS

The foregoing and other objects, features, aspects, and advantages of the present invention will be clarified from the following detailed explanation of the present invention understood in relation to the accompanying drawings.

Embodiments will be explained below with reference to the drawings. In the following explanation, identical components and constituent elements are given identical reference signs. The same thing can be said to their names and functions. Therefore, detailed explanations thereof will not be repeated. The embodiments and/or modification examples explained below may be selectively combined.

<First Embodiment>

[Overview]

Figure 2A:
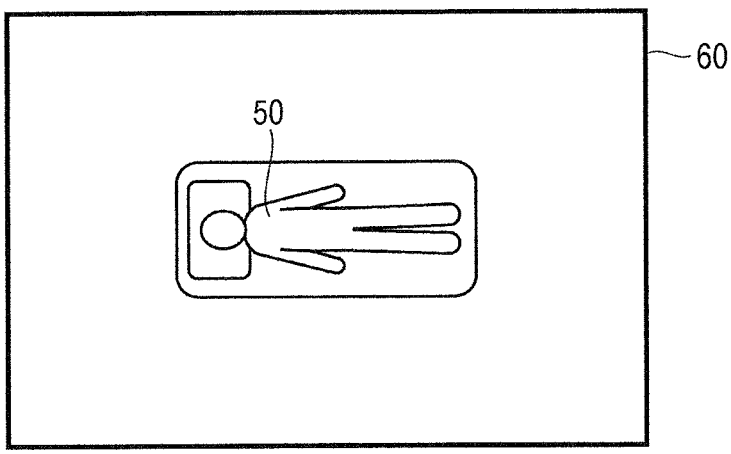
FIG. 2 is a diagram illustrating input images obtained by the camera shooting a person in various orientations.
Figure 2B:
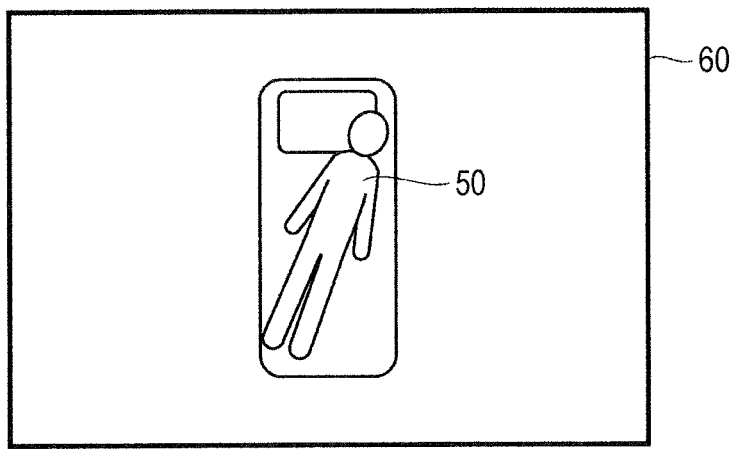
Figure 2C:
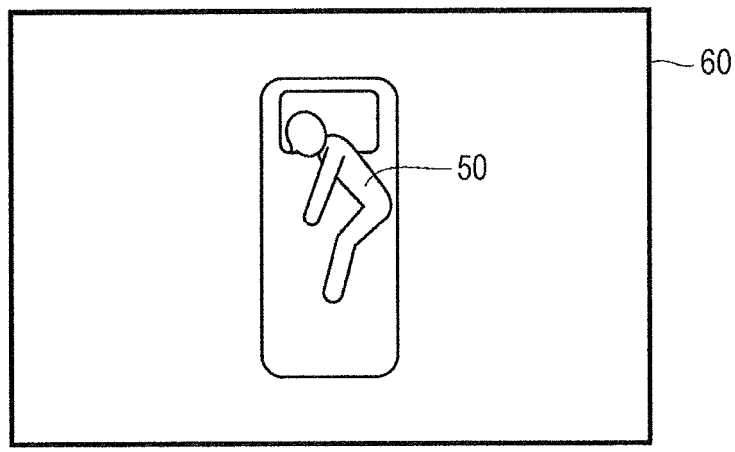

The overview of an image processing apparatus 100 according to a first embodiment will be provided with reference to FIGS. 1 to 4. FIG. 1 is a diagram illustrating the state in which a camera 110 connected to the image processing apparatus 100 is shooting a subject. FIG. 2 is a diagram illustrating input images obtained by the camera 110 shooting a person in various orientations. FIG. 3 is a conceptual diagram schematically illustrating a human detection process according to a related art. FIG. 4 is a conceptual diagram schematically illustrating a human detection process by an image processing apparatus 100.

In recent years, there have been diversified needs for image processing apparatuses for human detection. To meet the diversified needs, it is necessary to detect a person from images obtained from cameras installed at every place. For detection of a person independently of the installation sites of the cameras, the person seen in various orientations within the input images needs to be detected. The image processing apparatus 100 according to the embodiment allows detection of a person seen in the input images independently of the orientation of the human body.

FIG. 1 illustrates the state in which the camera 110 connected to the image processing apparatus 100 is shooting a person 50 existing in a space. An input image 60 is obtained by the camera 110 shooting the person 50. The input image 60 obtained by the camera 110 may be a general two-dimensional image including brightness values (hereinafter, also called "brightness image"), or may be three-dimensional information including distances from the camera 110 to respective points of the subject (hereinafter, also called "distance image"). The input image 60 obtained by the camera 110 may be a still image or a moving image.

Depending on the placement position of the camera 110, the person is seen in various orientations in the input image. For example, as a posture (A) of FIG. 2, when a person lying on a bed is targeted, the person 50 may be seen sideways relative to the orientation of the input image 60 depending on the positional relationship between the bed and the camera 110. The situation in which the camera 110 is installed on the leg side of the person 50 to obtain an image of the person 50 seen in a specific orientation in the input image 60 (for example, portrait orientation in the input image 60) will be discussed. In this case, the degree of freedom of the posture of the person 50 is higher in the lying state than in the standing state. Accordingly, as in a posture (B) and a posture (C) of FIG. 2, the person 50 may not be necessarily seen in a constant orientation in the input image 60 (portrait orientation in the input image 60).

Besides, free-viewpoint cameras such as a ball-type camera have appeared in recent years. In the case of using such a camera, the viewpoint always varies and the orientation of the human body also varies constantly.

As described above, the person 50 is in various orientations in the input image 60 depending on the installation position and the type of the camera. The image processing apparatus 100 according to the embodiment can detect a human region even though the person is in various orientations within the image.

(Overview of Image Processing According to the Related Art)

A human detection process according to the related art will be explained with reference to FIG. 3 for more understanding of the image processing apparatus 100 according to the embodiment. FIG. 3 is a conceptual diagram schematically illustrating a human detection process according to a related art.

The image processing technique according to the related art is intended to search for a human region while scanning the input image 60 with a human search window 80 and rotating the human search window 80 in small motions. By the image processing technique according to the related art, for example, when there is a match between a feature amount extracted from the search window and a preset template (feature amount), the position of the search window is determined as a human region. Therefore, the image processing technique according to the related technique allows detection of the human region independently of the orientation of the human body in the image. However, the image processing technique requires execution of image processing while rotating successively the search window, which may take an immense amount of computation time.

(Overview of Image Processing According to the Embodiment)

The image processing apparatus 100 according to the embodiment detects a human region without taking a large amount of computation time even with an image in which the orientation of the human body is unknown. More specifically, as illustrated in FIG. 4, the image processing apparatus 100 first detects head position 72 from the input image 60. Then, the image processing apparatus 100 uses feature amounts extracted from a trunk search window 70 as an image region around the detected head position 72 to determine relative positional relationships between the head and other body parts in the input image 60. The relative positional relationships between the head and the other body parts include the orientation of the human body indicating the orientations of the other body parts relative to the head in the input image 60, for example. The orientation of the human body includes the orientation of the trunk relative to the head and the orientation of the legs relative to the head in the input image 60, for example.

After that, the image processing apparatus 100 sets at least one of the direction of searching for the human region and the region of searching for the human region, based on the relative positional relationships between the head and the other body parts, and searches for the human region in the input image 60. Typically, the image processing apparatus 100 sets the human search window 80 depending on the head position of the person 50 or the determined orientation of the human body. The image processing apparatus 100 searches the set human search window 80 for the human region, and detects the human region from the input image 60.

As described above, before the detection of the human region, the image processing apparatus 100 determines the orientation of the human body from the feature amounts of the peripheral region of the head. By setting the human search window 80 depending on the orientation of the human body, the image processing apparatus 100 does not need to search for the human region while rotating the human search window in small motions. This shortens significantly the computation time as compared to the case of performing the human detection process according to the related art.

[Hardware Configuration]

Figure 5:
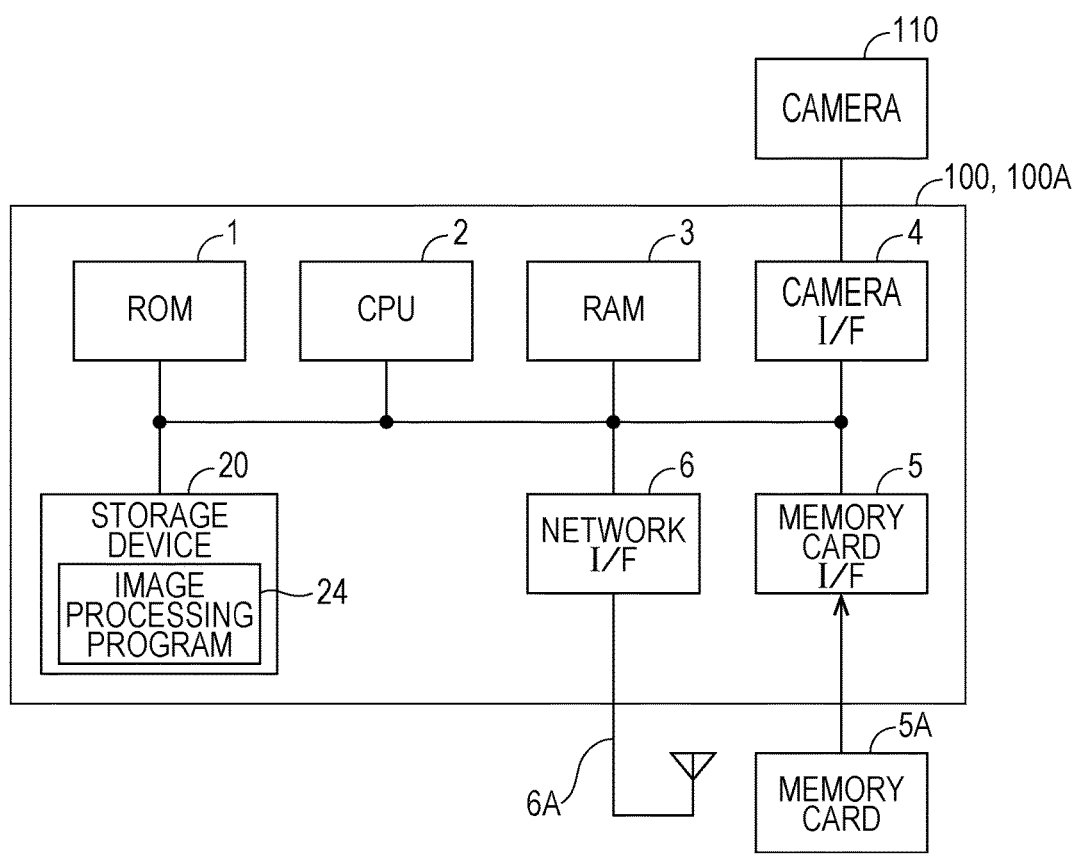
FIG. 5 is a block diagram of an example of a hardware configuration of the image processing apparatus according to the first embodiment.

FIG. 5 is a block diagram of an example of a hardware configuration of the image processing apparatus 100. A hardware configuration of the image processing apparatus 100 will be explained with reference to FIG. 5.

Referring to FIG. 5, the image processing apparatus 100 is mainly implemented on a computer having a general-purpose architecture. The image processing apparatus 100 includes a ROM (Read Only Memory) 1, a CPU (Central Processing Unit) 2, a RAM (Random Access Memory) 3, a camera interface (I/F) 4, a memory card interface (I/F) 5, a network interface (I/F) 6, and a storage device 20 as major components.

The ROM 1 stores an initial program (boot program) executed by the image processing apparatus 100 at a starting time, and the like. The CPU 2 executes various programs such as an operating system (OS) and an image processing program 24 stored in the ROM 1, the storage device 20, and the like to control the entire image processing apparatus 100. The RAM 3 serves as a working memory for the CPU 2 to execute the programs, and stores primarily various kinds of data necessary for execution of the programs.

The camera I/F 4 mediates data communications between the CPU 2 and the camera 110. For example, the camera I/F 4 includes an image buffer to accumulate temporarily distance images transmitted from the camera 110. When data of at least one input image is accumulated, the camera I/F 4 transfers the accumulated data to the storage device 20 or the ROM 1. The camera I/F 4 also gives an instruction for imaging to the camera 110 according to an internal command issued by the CPU 2. The camera 110 includes a stereo camera, a distance image sensor that detects three-dimensional position information of a subject, or another camera capable of acquiring a three-dimensional position of a subject, for example. The camera 110 may be incorporated into the image processing apparatus 100. In this case, the camera I/F 4 may not be necessarily provided.

The memory card I/F 5 reads and writes data from and into various memory cards (non-volatile storage media) 5A such as an SD (Secure Digital) card and a CF (Compact Flash (registered trademark)) card. Typically, a memory card 5A storing distance images acquired by another apparatus is attached to the memory card I/F 5, and the distance images read from the memory card 5A are stored in the storage device 20.

The network I/F 6 exchanges data with other devices (server device and the like) via various communication media such as an antenna 6A. More specifically, the network I/F 6 conducts data communications via wired lines such as Ethernet (registered trademark) (LAN (Local Area Network), WAN (Wide Area Network), and the like), and/or wireless lines such as wireless LAN.

The storage device 20 typically includes a large-capacity magnetic storage medium such as a hard disc. The storage device 20 stores the image processing program 24 for implementing various processes according to the embodiment. The storage device 20 may further store a program such as an operating system.

The camera 110 may not be externally provided but may be incorporated into the image processing apparatus 100 so that the image processing apparatus 100 itself has the function of shooting a subject. The image processing apparatus 100 may also be configured to acquire a distance image by the use of a mechanism similar to a camera, and input the acquired distance image to the image processing apparatus 100 by an arbitrary method. In this case, the distance image is input into the image processing apparatus 100 via the memory card I/F 5 or the network I/F 6.

The image processing program 24 stored in the storage device 20 is saved in a storage medium such as a CD-ROM (Compact Disk-Read Only Memory) and distributed, or is delivered from a server device or the like via a network. The image processing program 24 may call necessary ones of program modules provided as part of the operating system to be executed on the image processing apparatus 100 at a predetermined timing and in a predetermined sequence, and implement the processing. In this case, the image processing program 24 does not include the modules provided by the operating system but cooperates with the operating system to implement the image processing.

The image processing program 24 may not necessarily be a single program but may be incorporated in part of an arbitrary program. In this case as well, the image processing program 24 does not include modules used in common by arbitrary programs but cooperates with the arbitrary programs to implement the image processing. The image processing program 24 not including some modules as described above does not deviate from the gist of the image processing apparatus 100 according to the embodiment. Further, some or all of the functions provided by the image processing program 24 may be implemented by dedicated hardware.

Further, the image processing apparatus 100 may not necessarily perform the processing in real time. For example, the image processing apparatus 100 may be configured in the form of a cloud service in which at least one server device implements the processing according to the embodiment. In this case, the distance image is transmitted to the server device (cloud side), and the server device performs the image processing according to the embodiment on the received distance image. Moreover, the server device may not necessarily perform all the functions (processes) but the terminal of the user side and the server device may cooperate with each other to implement the image processing according to the embodiment.

[Functional Configuration]

Figure 6:
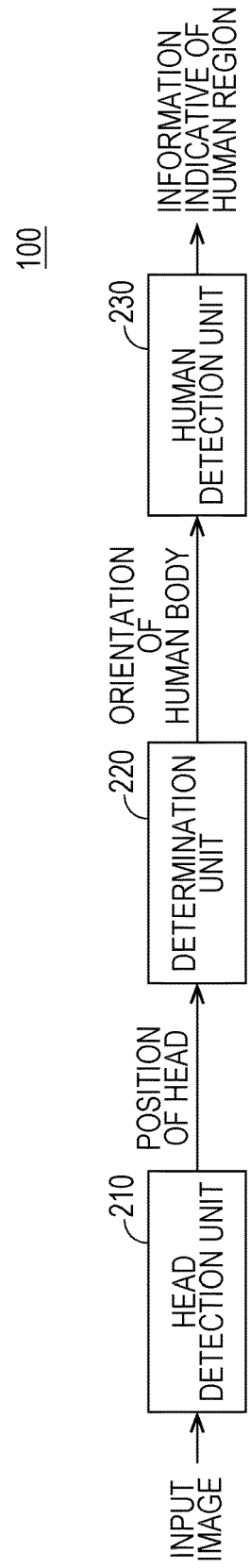
FIG. 6 is a block diagram of an example of a functional configuration of the image processing apparatus according to the first embodiment.

A functional configuration of the image processing apparatus 100 according to the first embodiment will be explained with reference to FIG. 6. FIG. 6 is a block diagram of an example of a functional configuration of the image processing apparatus 100. The image processing apparatus 100 includes a head detection unit 210, a determination unit 220, and a human detection unit 230.

The head of a human is very characteristic among the parts of the human body. Accordingly, the image processing apparatus 100 can use the position of the head as a point of origin in the detection of the human region. The head detection unit 210 detects the positon of the head of a person within the input image 60. The position of the head is detected as coordinate information within the input image 60, for example. The head detection unit 210 outputs the detected head position to the determination unit 220.

Specific methods for detection of the head may be template matching with a face database and a technique using Haar-Like features focusing on the parts of the face such as eyes and a nose, for example. In the case of using these methods, the head detection unit 210 can determine the orientation of the face from the positions of the parts of the face and the like, and automatically can also determine the orientation of the human body. However, to determine the orientation of the face, the image processing apparatus 100 needs to shoot the face from almost the front side. When the face cannot be shot from the front side, the characteristic parts of the face such as eyes and a nose are not seen in the input image 60, and the head detection unit 210 may not determine the orientation of the face. In addition, the head detection unit 210 needs to search for the head while rotating a template for face detection in small motions to align the positions of the parts of the face. This may take a large amount of computation time.

Accordingly, the head detection unit 210 uses a distance image (three-dimensional information) obtained by shooting the subject as the input image 60 to detect the head from the distribution condition of the distance in the distance image. That is, the head detection unit 210 detects a sphere indicative of the outer shape of the face in the distance image. Since the shape of the head is similar to a sphere, the outer shape does not vary largely even when being rotated. Accordingly, the head detection unit 210 can detect the position of the head by detecting the sphere without rotating the template for head detection. Therefore, the head detection unit 210 can implement the head detection process in a fast and stable manner.

The process executed by the head detection unit 210 is not limited to the foregoing one but may be any process as far as it allows detection of the head from the input image 60. For example, the head detection unit 210 may detect the head by using a head shape model, not the sphere. In addition, the head detection unit 210 may use information of distance from the camera to the head. Accordingly, the head detection unit 210 can detect accurately the size of the head in the input image 60 by detecting the head with the use of the head shape model or the information of distance to the head. Further, the head detection unit 210 may detect the position of the head in the input image 60 by detecting outer shape edges of the face seen in a brightness image. In this case, the head detection unit 210 detects a circle indicative of the outer shape of the face in the input image 60.

The determination unit 220 determines the relative positional relationships between the head and other body parts in the input image 60 with the use of feature amounts extracted from the peripheral region of the head position detected by the head detection unit 210. Typically, the determination unit 220 determines the orientation of the human body indicative of the orientation of the trunk relative to the head as the positional relationship. The determination unit 220 outputs the determined orientation of the human body to the human detection unit 230. The details of a method for determining the orientation of the human body by the determination unit 220 will be described later.

The human detection unit 230 detects the human region from the input image 60 with the use of the result of head detection by the head detection unit 210 and the orientation of the human body determined by the determination unit 220. For example, to shorten the processing time, the human detection unit 230 detects the human region with limitation to at least one of the search direction and the search region, depending on the orientation of the human body determined by the determination unit 220. The detected human region is provided as coordinate information in the input image 60, for example.

As a more specific processing procedure, the human detection unit 230 rotates either a template for use in search for a human region or the input image 60 depending on the determined orientation of the human body and performs a matching process to detect the human region in the input image 60. The template includes edge information, HOG (Histogram of Oriented Gradient), or other feature amounts extracted from the image of a person in the standing posture. Typically, the human detection unit 230 executes the human detection process while rotating the template in the direction along the determined orientation of the human body with reference to the position of the head.

In addition, the human detection unit 230 can determine the direction of scanning the input image 60 from the orientation of the human body, which makes it possible to apply the existing human detection process almost directly. That is, even with the application of the existing human detection process, the human detection unit 230 does not need to rotate the template, the input image 60, or the like at each time, thereby preventing increase in the computation amount. In addition, the human detection unit 230 may detect the human region by tracking a convex in the distance image and detecting a person.

[Details of the Determination Unit 220]
(Overview of the Determination Unit 220)

A specific process by the determination unit 220 will be explained below with reference to FIGS. 7 to 11. The determination unit 220 determines the orientation of the human body from the input image 60 with the use of the result of detection by the head detection unit 210. Since the head and the trunk of a human are connected via the neck, the positional relationship between the head and the trunk varies somewhat when the neck is inclined. However, the fact that the trunk exists around the head remains unchanged.

The determination unit 220 determines the orientation of the human body capitalizing on the continuity between the head and the trunk in the human body. That is, the determination unit 220 searches for the feature amount indicative of the trunk of the person from the feature amounts extracted from the peripheral image region of the head, and determines the orientation of the trunk relative to the head as the orientation of the human body. The process by the determination unit 220 for determining the orientation of the human body can be performed by various methods. Specific examples of process by the head detection unit 210 for determining the orientation of the human body will be explained in sequence.

The following specific examples are explained as the methods for determining the orientation of the human body in a lying posture. However, the determination unit 220 can determine the orientation of the human body even when the person is in a standing posture or another posture.

(Specific Example 1 of Process by the Determination Unit 220)

Figure 7:
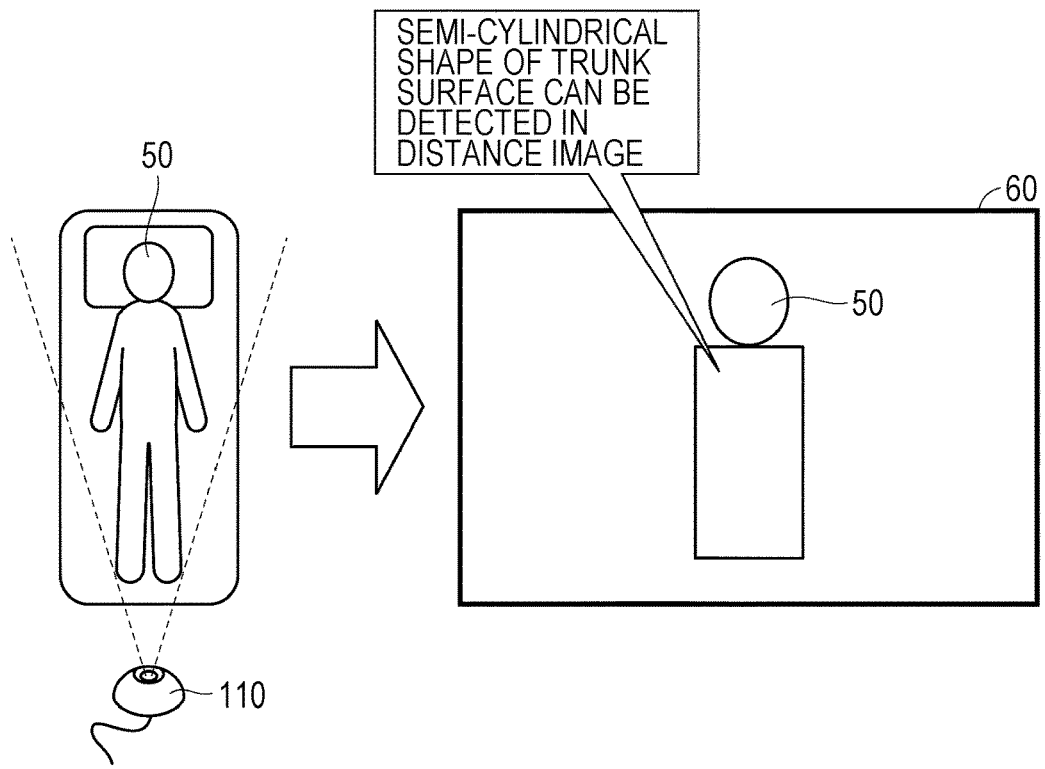
FIG. 7 is a conceptual diagram schematically illustrating a process for determining the orientation of a human body from an image obtained by shooting a person.
Figure 8:
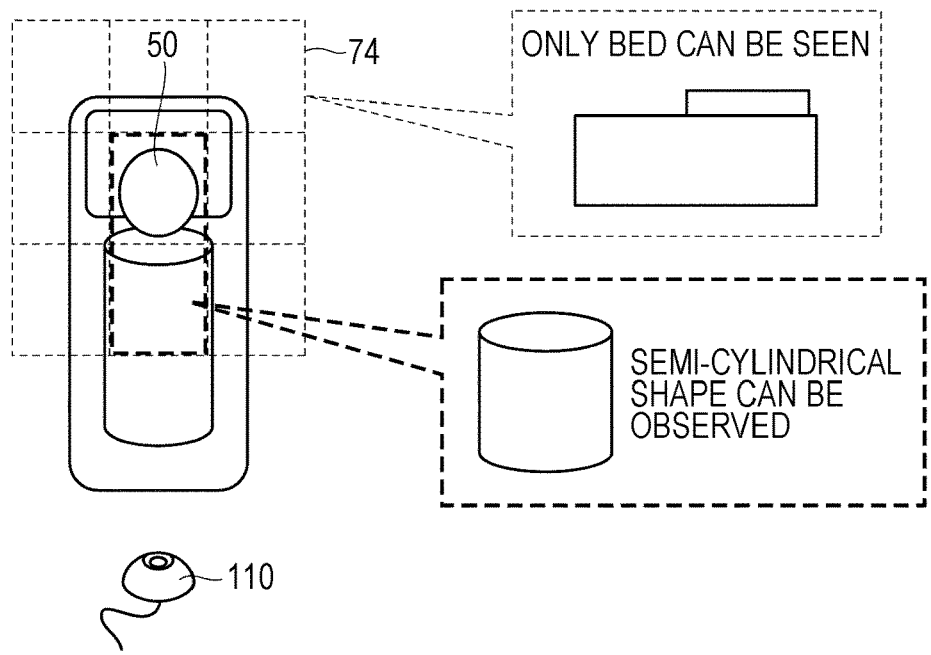
FIG. 8 is a diagram illustrating visually a region to be searched around the head.
Figure 9:
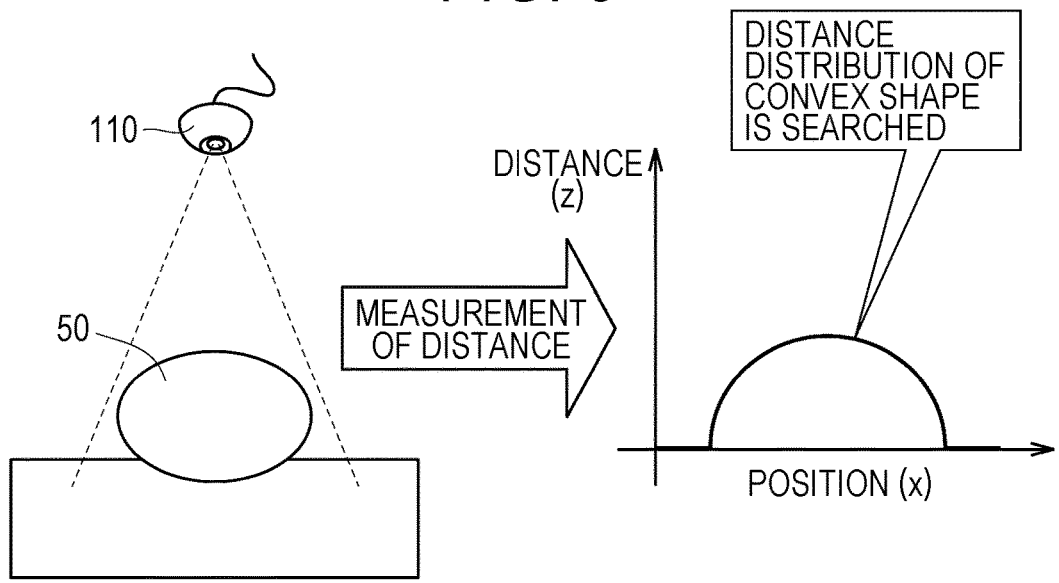
FIG. 9 is a conceptual diagram schematically illustrating a process for determining the orientation of the human body using distance information.

An example of process by the determination unit 220 will be explained with reference to FIGS. 7 to 9. FIG. 7 is a conceptual diagram schematically illustrating a process for determining the orientation of a human body from an input image obtained by shooting a person. FIG. 8 is a diagram illustrating visually a region to be searched around the head. FIG. 9 is a conceptual diagram schematically illustrating a process for determining the orientation of the human body using distance information. For the sake of simplified explanation, FIG. 9 illustrates the position of the subject two-dimensionally by positon (x axis) and distance (z axis). In actuality, however, the determination unit 220 can obtain the position of the subject as three-dimensional information indicated by the x axis, the z axis, and a y axis orthogonal to the x and z axes (not illustrated).

The trunk of the person is similar to a cylinder in shape. Accordingly, the presence of a cylindrical shape in the head peripheral region could be a highly potential clue about determining the position of the trunk of the person. When detecting the position or orientation of the trunk, the determination unit 220 can determine the orientation of the human body in the input image 60 from the relative positional relationship between the position of the head and the position of the trunk. In this example, only the half of the trunk of the person falls within the field of view of the camera. Accordingly, the result of measuring the distance to the lying person distributes in a semi-cylindrical shape or a convex shape along the surface of the human body as illustrated in FIG. 7, for example. The determination unit 220 thus regards the trunk of the person as being in a semi-cylindrical shape or convex shape. That is, the determination unit 220 can determine the orientation of the human body by searching for a semi-cylindrical shape or a convex shape in the region adjacent to the head. In the following description, the term "semi-cylindrical shape" can include a concept of "convex shape," and the term "convex shape" can include a concept of "semi-cylindrical shape."

The determination unit 220 decides a region in which the trunk is to be searched for (that is, the trunk search window 70) with reference to the position of the head in the input image 60 detected by the head detection unit 210. The determination unit 220 searches for the semi-cylindrical shape of the human body in the peripheral region 74 of the head of the person 50 as illustrated in FIG. 8, for example. In the example illustrated in FIG. 8, the trunk is detected at the lower side of the head on the plane of paper. The determination unit 220 determines the orientation of the trunk relative to the head as the orientation of the human body. Alternatively, the determination unit 220 determines the axial orientation of the semi-cylindrical shape as the orientation of the human body.

To search for a convex shape in the distance image, the determination unit 220 uses the distance information on the plane of the bed as illustrated in FIG. 9. The human body is regarded to have a semi-cylindrical convex distance distribution on the plane of the bed. Accordingly, the determination unit 220 can determine the orientation of the trunk by searching for a region with a convex distance distribution around the head.

(Specific Example 2 of Process by the Determination Unit 220)

Figure 10:
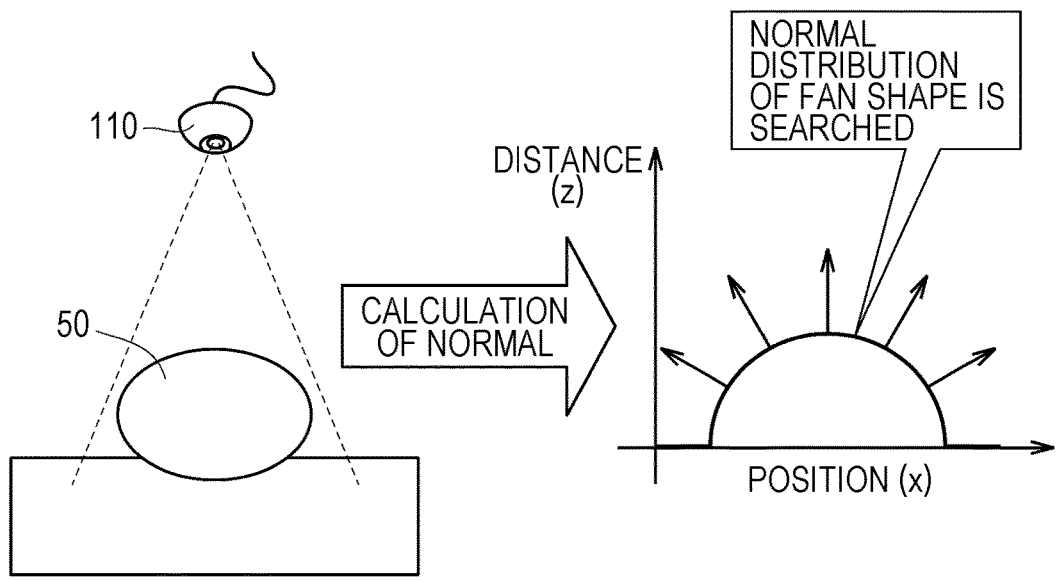
FIG. 10 is a diagram schematically illustrating a process for determining the orientation of the human body using normal information relative to the surface of the subject calculated from a distance image.

A specific example of process by the determination unit 220 will be explained with reference to FIG. 10. FIG. 10 is a diagram schematically illustrating a process for determining the orientation of the human body using normal information relative to the surface of the subject calculated from a distance image. For the sake of simplified explanation, FIG. 10 illustrates the position of the subject two-dimensionally by positon (x axis) and distance (z axis). In actuality, however, the determination unit 220 can obtain the position of the subject as three-dimensional information indicated by positon (x axis, y axis) and distance (z axis).

As another specific method for determining the orientation of the human body, normal information on the surface of the subject may be used. As described above, the trunk of the person has a convex shape, and the normal to the surface of the trunk is considered to distribute in a fan shape as illustrated in FIG. 10. That is, the determination unit 220 can determine the orientation of the trunk by searching the image region around the head for the fan-shaped normal distribution.

As a more specific processing procedure, the determination unit 220 extracts the distribution of a normal vector to the surface of the subject from the image region around the head. The determination unit 220 determines the orientation of the human body from the orientation in which the distribution of the normal vector to the surface of the trunk of the person exists in the extracted distribution of the normal vector. The "distribution of the normal vector to the surface of the trunk of the person" here includes the distribution of a normal vector to the surface of a semi-cylindrical shape, the distribution of a normal vector to the trunk shape of the person obtained in advance by learning, and the distribution of a normal vector relative to another trunk.

Typically, the determination unit 220 detects the region in the presence of the distribution of the normal vector to the surface of the trunk of the person as the human trunk region from the image region around the head, and determines the orientation of the trunk region to the head position as the orientation of the human body. Alternatively, the determination unit 220 may determine the orientation of the human body or the orientation of the trunk from the distribution of the normal vector in the detected trunk region, without the use of the head position.

By using the normal information calculated from the distance image as described above, the determination unit 220 can reduce the influence of distance variation due to the presence of a comforter or the like, as compared to the case of using the distance information alone. That is, the determination unit 220 can reduce the influence of noise and allow stable detection. In addition, by the use of the normal information, the determination unit 220 can allow high-accuracy determination with the three-dimensional shape of the human body.

(Specific Example 3 of Process by the Determination Unit 220)

As still another example of process by the determination unit 220, distance difference information may be used. For example, focusing on the fact that the distance from the plane of the bed to the head and the distance from the plane of the bed to the trunk are equal, the determination unit 220 calculates the distances from the plane of the bed to regions around the head, and determines the orientation of a large number of regions at distances smaller than a predetermined value as the orientation of the trunk. The predetermined value may be decided from the thickness of the human body or the comforter, for example. Alternatively, the predetermined value may be the value of the thickness of the human body or the comforter.

More specifically, the determination unit 220 calculates relative distances to the plane of the bed using a distance image including distances to respective points on the surface of the subject. That is, the determination unit 220 calculates the distances from the respective points on the subject around the head to the plane of the bed. Accordingly, the determination unit 220 extracts the relative distances from the respective points on the subject around the head to the plane of the bed as feature amounts. The determination unit 220 uses the extracted feature amounts to determine the orientation of the human body from the orientation of a region having a specific or larger number of pixels at relative distances smaller than the predetermined value. Typically, the determination unit 220 detects the region having a specific or larger number of pixels with values smaller than the predetermined value as the trunk region of the person, and determines the orientation of the trunk region relative to the head position as the orientation of the human body. Alternatively, the determination unit 220 may determine the orientation of the human body or the orientation of the trunk from the detected shape of the trunk region without using the head position.

By using the relative distances from the plane of the bed as described above, the determination unit 220 can exclude efficiently regions not related to the human region, such as the background region, and determine the orientation of the human body with high accuracy.

In the foregoing example, the determination unit 220 determines the orientation of the human body with the use of the relative distances from the plane of the bed. Alternatively, the determination unit 220 may determine the orientation of the human body with the use of relative distances from the head in the image region around the head. More specifically, the determination unit 220 calculates the relative distances from the head using a distance image including distances to respective points on the surface of the subject. That is, the determination unit 220 takes the differences between the distance to the head position and the distances to the respective points on the subject around the head. Accordingly, the determination unit 220 extracts the relative distances to the head of the subject around the head as feature amounts. The determination unit 220 uses the extracted feature amounts to determine the orientation of the human body from the orientation of a region having a specific or larger number of pixels with relative distances smaller than the predetermined value. Typically, the determination unit 220 detects the region having a specific or larger number of pixels with values smaller than the predetermined value as the trunk region of the person, and determines the orientation of the trunk region relative to the head position as the orientation of the human body. Alternatively, the determination unit 220 may determine the orientation of the human body or the orientation of the trunk from the detected shape of the trunk region without using the head position.

(Specific Example 4 of Process by the Determination Unit 220)

As still another example of process by the determination unit 220, background difference information obtained by taking the difference between the input image 60 (distance image) and a background distance image may be used. Focusing on the fact that a person is discontinued from a background, the determination unit 220 determines the orientation of a large number of regions with larger values of distance differences between the image region around the head and the background distance image than a predetermined value as the orientation of the trunk.

More specifically, the determination unit 220 extracts differences in distance from the background by taking the differences between the background distance image obtained by shooting the background without the person and the distance image acquired at a timing, as the feature amounts. Then, the determination unit 220 determines the orientation of a region having a larger distance difference than a predetermined value in the image region around the head, as the orientation of the human body. Typically, the determination unit 220 detects a region having a specific or larger number of pixels with larger distance differences than the predetermined value as the trunk region of the person, and determines the orientation of the trunk region relative to the head position in the input image 60 as the orientation of the human body. Alternatively, the determination unit 220 may determine the orientation of the human body or the orientation of the trunk from the shape of the detected trunk region without the use of the head position.

As the background distance image, an image obtained by shooting without the person in the field of view of the camera is used, for example. Alternatively, as the background distance image, an image obtained by the head detection unit 210 shooting at a timing when the head is not detected in the input image 60 may be used. By using the distance image obtained by taking the background difference as described above, the determination unit 220 can exclude efficiently regions not related to the human region, such as the background region, and determine the orientation of the human body with high accuracy.

(Specific Example 5 of Process by the Determination Unit 220)

Figure 11:
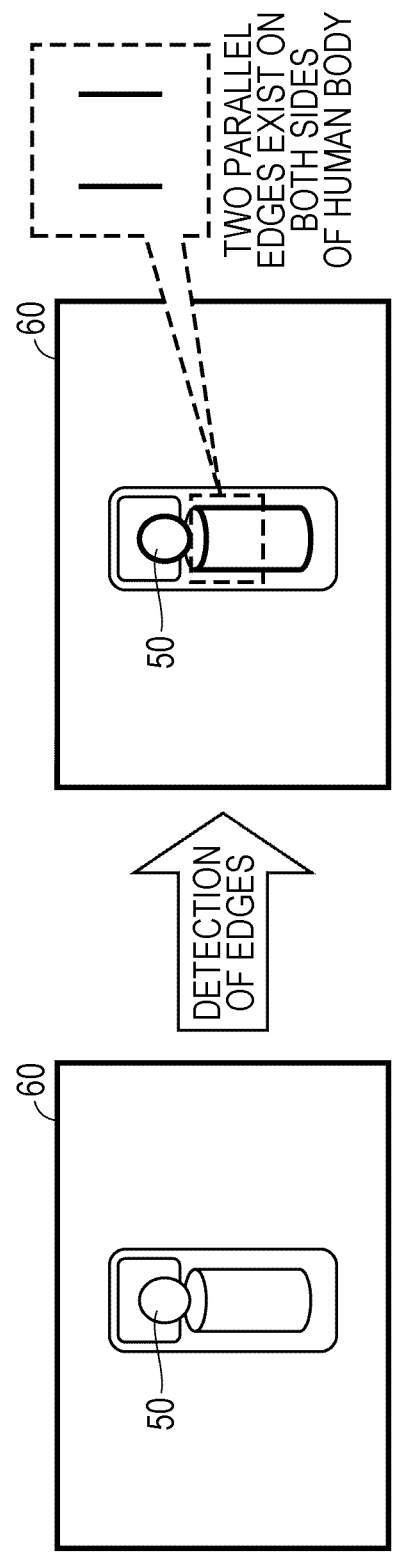
FIG. 11 is a conceptual diagram schematically illustrating a process for determining the orientation of the human body using edge information acquired from the input image.

Still another specific example of process by the determination unit 220 will be explained with reference to FIG. 11. FIG. 11 is a conceptual diagram schematically illustrating a process for determining the orientation of the human body using edge information acquired from the input image 60.

As a method for determining the orientation of the human body, edge information acquired from the input image 60 (distance image) may be used. When the trunk of the person is regarded as being cylinder in shape, the distance from the camera 110 to the subject changes sharply on the both sides of the trunk of the person. That is, two long parallel distance edges are assumed to be on the both sides of the trunk. Accordingly, as illustrated in FIG. 11, by searching for the two long parallel distance edges in the image region adjacent to the head, the determination unit 220 can determine the orientation of the trunk. That is, the determination unit 220 determines the orientation of the human body from the orientation of the two parallel edges in the edge information extracted from the image region around the head.

More specifically, the determination unit 220 extracts edges from the input image 60 (distance image). The edge extraction is performed by differentiating the distance image and determining the gradient of pixel values, for example. Typically, the determination unit 220 performs edge extraction by convolving a differential filter, a prewitt filter, a sobel filter, a laplacian filter, an LOG filter, or any other filter capable of extracting edges with the distance image.

As a method for detecting the two parallel edges, for example, the determination unit 220 extracts edge information in the image region around the head as feature amount, and uses the extracted edge information to detect straight lines existing in the image region around the head. When detecting two straight lines extending in parallel or in similar orientations, the determination unit 220 determines the region between the two straight lines as the region of the trunk of the person.

By using the edge information as described above, the determination unit 220 can exclude efficiently regions not related to the human region without distance change or brightness change, and determine the orientation of the human body with high accuracy. In addition, since the edge information can be obtained even from a low-resolution image, the determination unit 220 can determine the orientation of the human body even though the image is low in resolution.

In addition, when a person is lying wrapped in a comforter or a blanket, it is difficult to determine the orientation of the human body from a general image. However, even when a person is wrapped in a comforter, the fact that the surface of the trunk has a convex shape remains unchanged. Accordingly, the method using the distance image is still effective.

(Specific Example 6 of Process by the Determination Unit 220)

As still another example of process by the determination unit 220, an image including brightness values (that is, a brightness image) may be used. In the case of using the brightness image as the input image 60, unlike the case of using the distance image, it is difficult for the determination unit 220 to search for a convex shape because a three-dimensional shape cannot be obtained. However, the determination unit 220 can determine the orientation of the human body by searching for human body characteristics in the brightness image.

More specifically, the determination unit 220 may use brightness edges extracted from the brightness image. When the trunk is regarded as being cylindrical in shape, the distance from the camera changes sharply on the both sides of the trunk. Since the distance changes on the both sides of the trunk, the brightness is also likely to change on the both sides. That is, the determination unit 220 can observe two parallel edges on the both sides of the trunk even in the brightness image. The determination unit 220 determines the orientation of the human body from the orientation of the two parallel edges in the edge information extracted from the image region around the head.

In addition, even when a person is wrapped in a comforter, the brightness varies somewhat on the both sides of the trunk. Accordingly, the two parallel edges can be seen as in the distance image even when the person is wrapped in a comforter.

(Specific Example 7 of Process by the Determination Unit 220)

As still another example of process by the determination unit 220, brightness differential information may be used. When the background image of a bed or the like can be obtained in advance, the determination unit 220 can determine the human region by detecting portions different from the background. That is, the determination unit 220 determines the orientation of many regions with larger brightness differences from the background than a predetermined value around the head, as the orientation of the trunk.

More specifically, the determination unit 220 extracts brightness differences from the background obtained by taking the differences between a brightness image obtained by shooting the background without a person and a brightness image acquired at a timing, as feature amounts. Then, the determination unit 220 determines the orientation of the human body from the orientation of a region having brightness differences larger than a predetermined value in the image region around the head. Typically, the determination unit 220 detects a region having a specific or larger number of pixels with brightness differences larger than the predetermined value as the trunk region of the person, and determines the orientation of the trunk region relative to the head position as the orientation of the human body. The determination unit 220 may determine the orientation of the human body or the orientation of the trunk from the shape of the detected trunk region.

(Specific Example 8 of Process by the Determination Unit 220)

Besides, the determination unit 220 may use previous knowledge on the shape model of the human body and the position of the bed to search for the region around the head. When the position of the bed is known, it is generally assumed that the head is positioned on the pillow and the trunk is positioned somewhere along the longitudinal side. Accordingly, the search range can be limited by the assumption.

(Specific Example 9 of Process by the Determination Unit 220)

Besides, the determination unit 220 may combine the plurality of specific examples 1 to 8 of processes described above, and consolidate the results of the plurality of processes to determine the orientation of the human body in the input image 60. For example, the determination unit 220 searches for a semi-cylindrical shape and two parallel edges in the image region around the head to determine the orientation of the human body. By combining the plurality of processes as described above, the determination unit 220 can determine the orientation of the human body in a more accurate manner.

[Flowchart]

Figure 12:
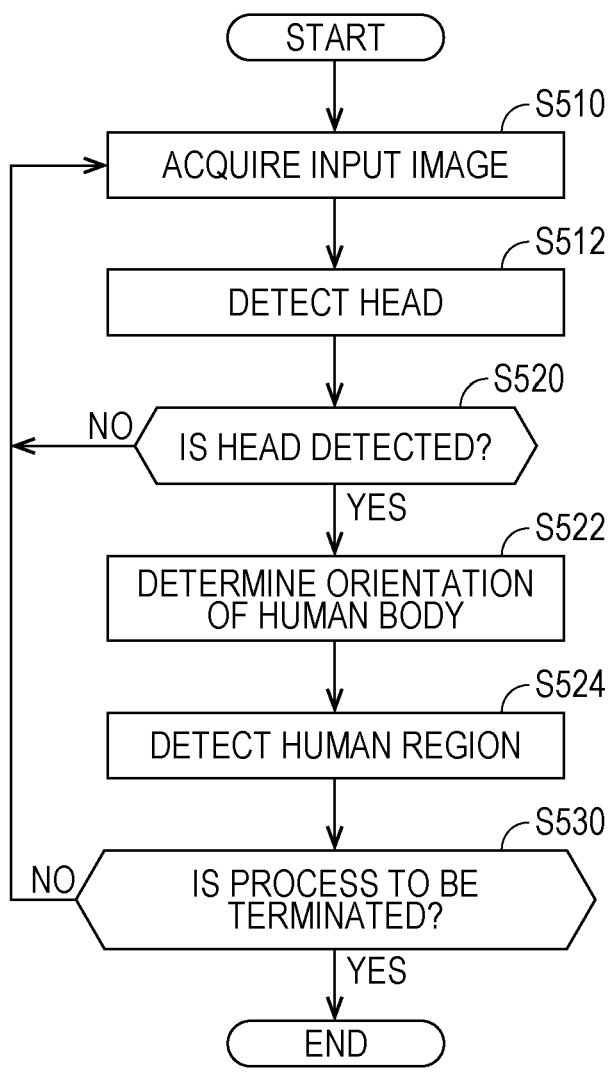
FIG. 12 is a flowchart of part of a process executed by the image processing apparatus according to the first embodiment.

A control structure of the image processing apparatus 100 will be explained with reference to FIG. 12. FIG. 12 is a flowchart of part of a process executed by the image processing apparatus 100. The process of FIG. 12 is implemented by the CPU 2 executing a program. In another aspect, the process may be partially or entirely executed by a circuit element or other hardware.

At step S510, the CPU 2 acquires an input image. Typically, the CPU 2 acquires a distance image or a brightness image as an input image. At step S512, the CPU 2 causes the head detection unit 210 to detect the position of the head of the person in the acquired input image. At step S520, the CPU 2 causes the head detection unit 210 to determine whether the head of the person is detected in the input image. When determining that the head is detected (YES at step S520), the CPU 2 switches the control to step S522. When not determining so (NO at step S520), the CPU 2 returns the control to step S510.

At step S522, the CPU 2 causes the determination unit 220 to determine the orientation of the human body in the input image by the use of feature amounts extracted from the image region around the detected position of the head. At step S524, the CPU 2 causes the human detection unit 230 to search the input image with limitation to at least one of the search direction and the search region depending on the determined orientation of the human body, and detect the human region.

At step S530, the CPU 2 determines whether to terminate the image processing according to the embodiment. For example, upon receipt of a user operation for terminating the image processing, the CPU 2 terminates the image processing. When determining that the image processing according to the embodiment is to be terminated (YES at step S530), the CPU 2 terminates the image processing. When not determining so (NO at step S530), the CPU 2 executes again steps S510 to S530 in sequence.

[Advantages]

As described above, the image processing apparatus 100 according to the embodiment determines the orientation of the human body within the input image, and detects the human region depending on the orientation of the human body. This makes it possible to detect a person not depending on the positional relationship between the camera and the person. The image processing apparatus 100 can also determine the orientation of the person within the input image by a process with a relatively small amount of computation. Accordingly, the image processing apparatus 100 does not have to search for the human region while rotating the human search window successively, thereby shortening significantly the computation time.

<Second Embodiment>
[Overview]

An overview of an image processing apparatus 100A according to a second embodiment will be explained below. The image processing apparatus 100A according to the embodiment is different from the image processing apparatus 100 according to the first embodiment in that the search range for the trunk region and the human region in the input image is changed as appropriate. A hardware configuration of the image processing apparatus 100A according to the embodiment is the same as that of the image processing apparatus 100 according to the first embodiment, and descriptions thereof will be omitted.

The sizes of the parts of the human body correlate somewhat with the size of the head. Accordingly, the sizes or ratios of the human body parts (in particular, the trunk) relative to the head can be determined to some degree from the size of the head. Focusing on that respect, the image processing apparatus 100A changes as appropriate the size of the trunk search window 70 (see FIG. 4) for searching for the orientation of the human body depending on at least one of the determined size of the head and the position of the head. Accordingly, the image processing apparatus 100A can determine the orientation of the human body excluding regions in which no person is seen. That is, the image processing apparatus 100A can shorten significantly the processing time taken for determining the orientation of the human body, and reduce false detection of the orientation of the human body.

In addition, the image processing apparatus 100A changes as appropriate the size of the human search window 80 (see FIG. 4) for detecting the human region using at least one kind of information on the size of the head, the position of the head, and the position of the trunk as well as the orientation of the human body. Accordingly, the image processing apparatus 100A can search for the human body excluding regions in which no person is seen. That is, the image processing apparatus 100A can shorten significantly the processing time taken for determining the detection of the human region, and reduce false detection of the human region.

[Functional Configuration]

Figure 13:
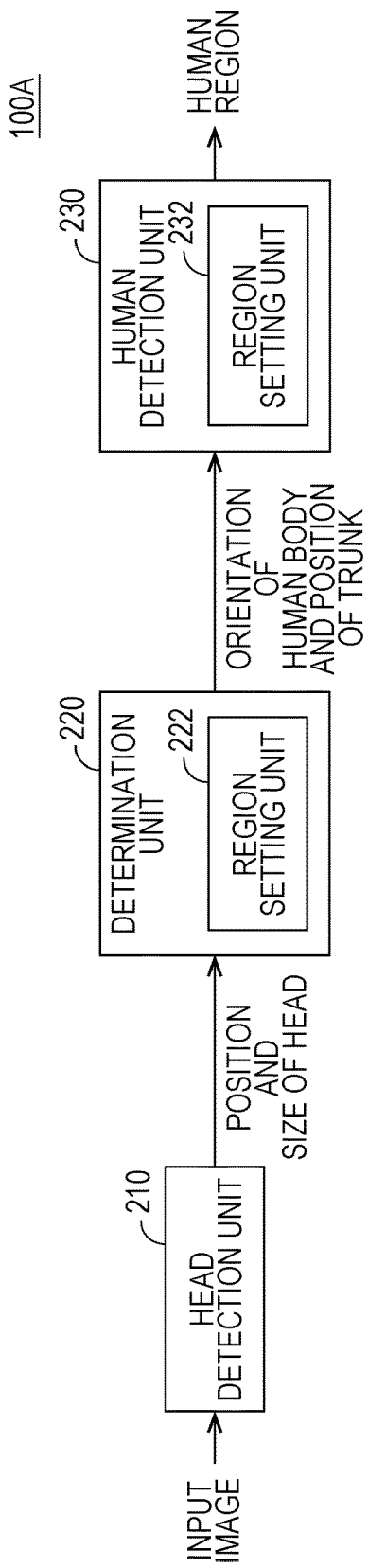
FIG. 13 is a block diagram of an example of a functional configuration of an image processing apparatus according to a second embodiment.

A functional configuration of the image processing apparatus 100A according to the second embodiment will be explained with reference to FIG. 13. FIG. 13 is a block diagram of an example of a functional configuration of the image processing apparatus 100A. The image processing apparatus 100A includes a head detection unit 210, a determination unit 220, and a human detection unit 230. The determination unit 220 includes a region setting unit 222 for setting the trunk search window 70 in the input image 60. The human detection unit 230 includes a region setting unit 232 for setting the human search window 80 in the input image 60.

The head detection unit 210 detects the head position in the input image 60 by the method described above, and detects the size of the head in the input image 60. The head detection unit 210 can obtain the size of the head along with the detection of the head position. For example, the head detection unit 210 detects the size of the head from the magnification ratio of a template in the head detection process such as template matching, or the size of the template, or the like. The size of the head in the input image 60 is indicated by the number of pixels included in the head region, the diameter of the head, or the like, for example.

The region setting unit 222 decides the size of the image region around the head (that is, the trunk search window 70) from which the feature amounts are extracted depending on the size of the head obtained from the head detection unit 210. The details of the process by the region setting unit 222 will be provided later. The determination unit 220 searches the trunk search window 70 set in the input image 60 by the region setting unit 222 to determine the orientation of the human body.

The region setting unit 232 detects the human region with limitation to the region in which the human region is searched for, depending on at least one of the position of the trunk in the input image 60 and the position of the head in the input image 60. Typically, the region setting unit 232 sets the human search window 80 in the input image 60 such that the head position obtained by the head detection unit 210 and the trunk position are included. The details of the process by the region setting unit 232 will be provided later. The human detection unit 230 searches the human search window 80 set in the input image 60 by the region setting unit 232 to detect the human region.

(Details of the Process by the Region Setting Unit 222)

Figure 15A:
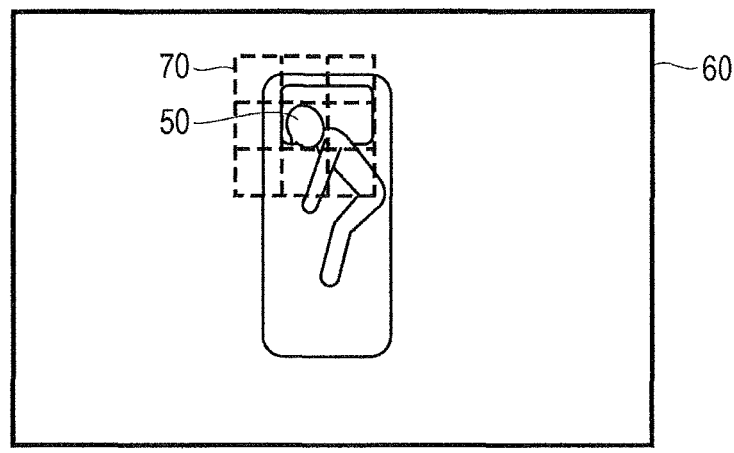
FIG. 15 is a conceptual diagram schematically illustrating a process for deciding the size of the trunk search window depending on the size of the head.
Figure 15B:
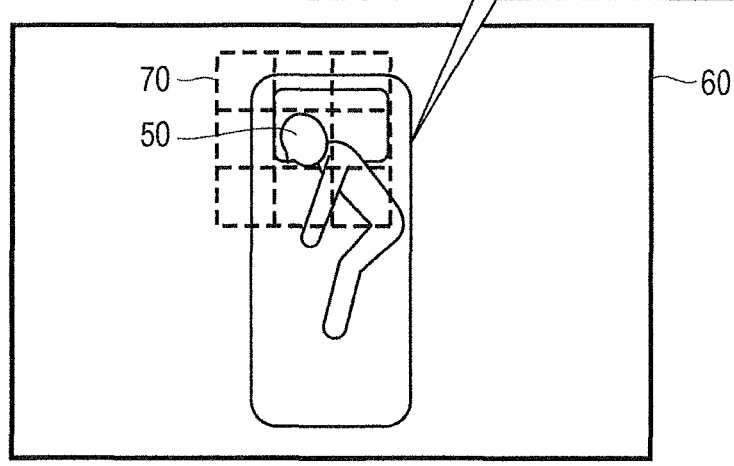

The details of a method for limiting the search range of the trunk region by the region setting unit 222 will be explained with reference to FIGS. 14 and 15. FIG. 14 is a conceptual diagram schematically illustrating a process for deciding the shape of the trunk search window 70 depending on the position of the head. FIG. 15 is a conceptual diagram schematically illustrating a process for deciding the size of the trunk search window 70 depending on the size of the head.

As illustrated in posture (A) of FIG. 14, the sizes of the parts of the human body correlate somewhat with the size of the head. Accordingly, the image processing apparatus 100A can estimate the sizes or ratios of the human body parts (in particular, the trunk) relative to the head to some degree from the size of the head. Focusing on this matter, the region setting unit 222 sets the trunk search window 70 in a shape suited to the region connected to the head. More specifically, the region setting unit 222 decides at least one of the position and size of the trunk search window 70 depending on the head size. For example, as illustrated in posture (B) of FIG. 14, the region setting unit 222 sets trunk search windows 70A to 70H such that the head position is included at one end around the head.

In addition, the region setting unit 222 may limit the search range and the window size by the use of a human body shape model for search around the head. Further, the region setting unit 222 may limit the size and radius of a convex shape determined as the trunk depending on the size of the head. By limiting the search range, the trunk search window size, the conditions for the convex shape to be recognized with the use of the previous knowledge such as a model, it is possible to eliminate the influence of the settings on the window suited to the size of the trunk of the person and a convex shape not related to the human body.

The region setting unit 222 may be configured to change the size of the trunk search window 70 depending on the size of the head as illustrated in FIG. 15. As described above, the size and ratio of other parts of the person relative to the size of the head can be estimated from the size of the head. Accordingly, the region setting unit 222 may perform searching with changed parameters such as the trunk search range and the trunk search window size from the head size. The image processing apparatus 100A can optimize the parameters in accordance with the size of the head. Therefore, the image processing apparatus 100A can cope with changes in the size of the trunk search window 70 due to variations in the magnification ratio and the differences in the body type, for example.

Typically, as illustrated in posture (A) of FIG. 15, the region setting unit 222 sets the size of the trunk search window 70 to be larger as the head size in the input image 60 is larger. Otherwise, as illustrated in posture (B) of FIG. 15, the region setting unit 222 sets the size of the trunk search window 70 to be smaller as the head size in the input image 60 is smaller.

In the example explained above, the size of the trunk search window 70 is changed. Alternatively, the region setting unit 222 may be configured to increase or decrease the size of the input image 60 while holding uniform the size of the trunk search window 70.

(Details of Process by the Region Setting Unit 232)

Figure 16A:
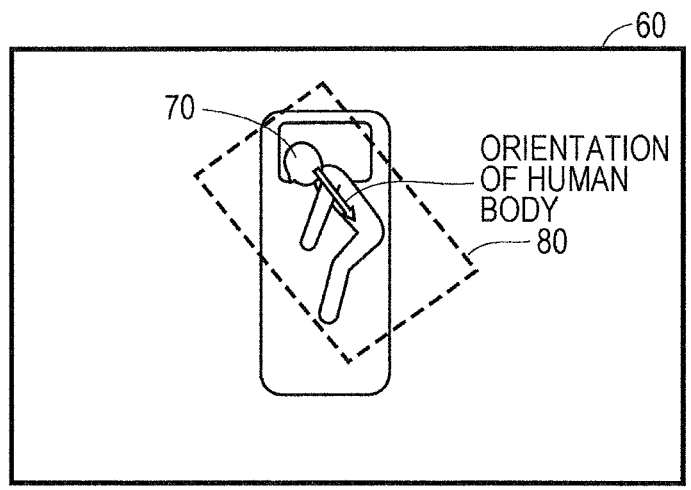
FIG. 16 is a conceptual diagram schematically illustrating a process for setting a human search window depending on the position of the head or the position of the trunk in the input image.
Figure 16B:
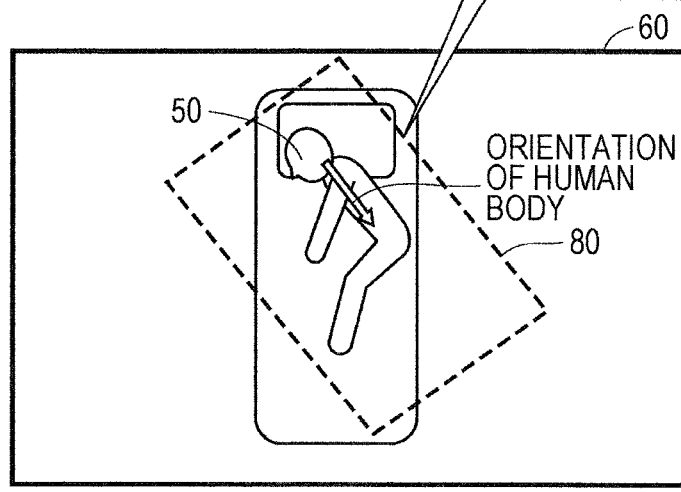

A method for limiting the search range of the human region by the region setting unit 232 will be explained with reference to FIG. 16. FIG. 16 is a conceptual diagram schematically illustrating a process for setting the human search window 80 depending on at least one of the size of the head in the input image, the position of the head, and the position of the trunk as well as the orientation of the human body.

As illustrated in FIG. 16, the region setting unit 232 sets the human region depending on the orientation of the human body determined by the determination unit 220. Typically, the region setting unit 232 decides the orientation of the human search window 80 along the orientation of the human body.

The region setting unit 232 decides the position of the human search window 80 depending on the head position and the trunk position in the input image 60. Typically, the region setting unit 232 sets the human search window 80 such that the position of the human search window 80 includes the head position and the trunk position in the input image 60.

The region setting unit 232 may decide the size of the human search window 80 depending on the head size in the input image 60. Typically, as illustrated in posture (A) of FIG. 16, the region setting unit 232 sets the size of the human search window 80 to be larger as the head size in the input image 60 is larger. Otherwise, as illustrated in posture (B) of FIG. 16, the region setting unit 232 sets the size of the region of the human search window 80 to be smaller as the head size in the input image 60 is smaller.

As described above, the region setting unit 232 sets the human search window 80 depending on the position of the head, the position of the trunk, and the size of the head as well as the orientation of the human body. Therefore, the image regions not related to the person can be excluded from the search target region. This makes it possible to shorten significantly the processing time and reduce false detection of the human region.

In the example explained above, the size of the human search window 80 is changed. Alternatively, the region setting unit 232 may be configured to increase or decrease the size of the input image 60 while holding uniform the size of the human search window 80.

[Flowchart]

Figure 17:
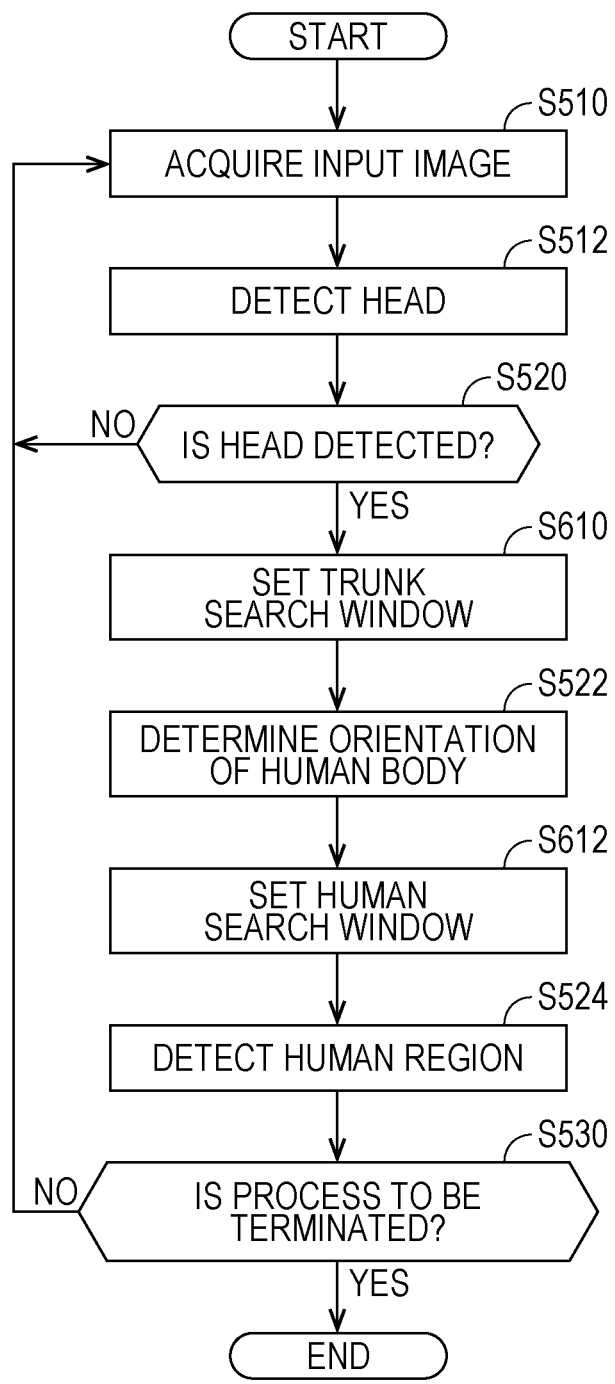
FIG. 17 is a flowchart of part of a process executed by the image processing apparatus according to the second embodiment.

A control structure of the image processing apparatus 100A will be explained with reference to FIG. 17. FIG. 17 is a flowchart of part of a process executed by the image processing apparatus 100A. The process of FIG. 17 is implemented by the CPU 2 executing a program. In another aspect, the process may be executed partially or entirely by a circuit element or other hardware.

At step S510, the CPU 2 acquires an input image. Typically, the CPU 2 acquires a distance image or a brightness image as an input image. At step S512, the CPU 2 causes the head detection unit 210 to detect the position of the head of the person in the acquired input image. At step S520, the CPU 2 causes the head detection unit 210 to determine whether the head of the person is detected in the input image. When determining that the head is detected (YES at step S520), the CPU 2 switches the control to step S610. When not determining so (NO at step S520), the CPU 2 returns the control to step S510.

At step S610, the CPU 2 causes the region setting unit 222 to decide the size of the image region around the head (that is, the trunk search window 70) and the position of the trunk search window 70 from which feature amounts for use in the detection of the trunk of the person depending on the acquired size of the head. At step S522, the CPU 2 causes the determination unit 220 to scan the set trunk search window 70 and determine the orientation of the human body with the use of the feature amounts extracted from the trunk search window 70.

At step S612, the CPU 2 causes the region setting unit 232 to decide the orientation of the human search window 80 depending on the determined orientation of the human body, and decide the position of the human search window 80 depending on at least one of the size of the head in the input image 60, the position of the head, and the position of the trunk.

At step S612, the CPU 2 decides the size and position of the image region for use in the detection of the human region (that is, the human search window 80) depending on at least one of the determined orientation of the human body, the size of the head, the position of the head, and the position of the trunk as the region setting unit 232. At step S524, the CPU 2 causes the human detection unit 230 to scan the set human search window 80 and determine the human region with the use of the feature amounts extracted from the human search window 80.

At step S530, the CPU 2 determines whether to terminate the image processing according to the embodiment. For example, upon receipt of a user operation for terminating the image processing, the CPU 2 terminates the image processing. When determining that the image processing according to the embodiment is to be terminated (YES at step S530), the CPU 2 terminates the image processing. When not determining so (NO at step S530), the CPU 2 executes again steps S510 to S530 in sequence.

[Advantages]

As described above, the image processing apparatus 100A according to the embodiment changes the size and position of the trunk search window in correspondence with the position and size of the head in the input image. Accordingly, it is possible to exclude the regions not related to the person in the input image and shorten significantly the computation time for detection of the trunk. At the same time, excluding the regions not related to the person in the input image leads to reduction in false detection of the trunk.

In addition, the image processing apparatus 100A decides the orientation of the human search window depending on the determined orientation of the human body, and changes the size and position of the human search window in correspondence with the position and size of the head in the input image. Accordingly, it is possible to exclude the regions not related to the person in the input image and shorten significantly the computation time for detection of the human region. At the same time, excluding the regions not related to the person in the input image leads to reduction in false detection of the human region.

The embodiments disclosed herein are mere examples, not limitative embodiments, in all respects. The scope of the present invention is indicated not by the foregoing explanation but by the claims, and is intended to include the equivalent of the claims and all modifications within the scope of the claims.

REFERENCE SIGNS LIST

1: ROM
2: CPU
3: RAM
4: Camera I/F
5: Memory card I/F
5A: Memory card
6: Network I/F
6A: Antenna
20: Storage device
24: Image processing program
50: Person
60: Input image
70: Trunk search window
72: Position
80 and 80A to 80H: Human search window
100 and 100A: Image processing apparatus
110: Camera
210: Head detection unit
220: Determination unit
222 and 232: Region setting unit
230: Human detection unit

The invention claimed is:

1. An image processing apparatus comprising:
a hardware processor that:
receives an input image of a person, including a head of the person and other body parts, the input image including a distance image having distances to respective points on the surface of a subject,
detects a position of the head of the person in the input image,
determines a relative positional relationship between the head and another body part in the input image with the use of feature amounts extracted from an image region around the detected position of the head, the feature amounts including a distribution of a normal vector to the surface of the subject extracted from the distance image,
sets at least one of the direction of searching for a human region and the region of searching for the human region in accordance with the determined relative positional relationship,
detects the human region from the input image,
detects a position of the head of the person based on a distribution of distances extracted from the distance image, and
determines the relative positional relationship from the orientation in which distribution of a normal vector to the surface of the trunk of the person exists in the distribution of the normal vector in the image region around the head.

2. The image processing apparatus according to claim 1, wherein the hardware processor searches for feature amounts indicative of the trunk of the person from the feature amounts extracted from the image region around the head, and determines the orientation of the trunk relative to the head as the relative positional relationship.

3. The image processing apparatus according to claim 1, wherein
the hardware processor further detects the size of the head of the person in the input image, and decides the size of the image region around the head from which the feature amounts are to be extracted, depending on the size of the head.

4. The image processing apparatus according to claim 3, wherein the hardware processor detects the human region in the input image with limitation to at least one of the direction of searching for the human region and the region of searching for the human region, depending on at least one of the position of the trunk in the input image obtained by searching, the position of the head in the input image, and the size of the head.

5. The image processing apparatus according to claim 1, wherein
the relative positional relationship includes the orientation of the human body indicative of the orientation of another body part relative to the head in the input image, and
the hardware processor performs matching process while rotating one of a template for use in search for the human region and the input image depending on the orientation of the human body, and detects the human region in the input image.

6. An image processing apparatus comprising:
a hardware processor that:
receives an input image of a person, including a head of the person and other body parts, the input image including a distance image having distances to respective points on the surface of a subject,
detects a position of the head of the person in the input image,
determines a relative positional relationship between the head and another body part in the input image with the use of feature amounts extracted from an image region around the detected position of the head, the feature amounts including a relative distance to the subject from the position of the head extracted from the distance image,
sets at least one of the direction of searching for a human region and the region of searching for the human region in accordance with the determined relative positional relationship,
detects the human region from the input image,
detects a position of the head based on a distribution of distances extracted from the distance image, and
determines the relative positional relationship from the orientation in which a region having a specific or larger number of pixels with smaller values of the relative distance than a predetermined value exists in the image region around the head.

7. The image processing apparatus according to claim 6, wherein the hardware processor searches for feature amounts indicative of the trunk of the person from the feature amounts extracted from the image region around the head, and determines the orientation of the trunk relative to the head as the relative positional relationship.

8. The image processing apparatus according to claim 6, wherein
the hardware processor further detects the size of the head of the person in the input image, and decides the size of the image region around the head from which the feature amounts are to be extracted, depending on the size of the head.

9. The image processing apparatus according to claim 8, wherein the hardware processor detects the human region in the input image with limitation to at least one of the direction of searching for the human region and the region of searching for the human region, depending on at least one of the position of the trunk in the input image obtained by searching, the position of the head in the input image, and the size of the head.

10. The image processing apparatus according to claim 6, wherein
the relative positional relationship includes the orientation of the human body indicative of the orientation of another body part relative to the head in the input image, and
the hardware processor performs matching process while rotating one of a template for use in search for the human region and the input image depending on the orientation of the human body, and detects the human region in the input image.

11. An image processing apparatus comprising:
a hardware processor that:
receives an input image of a person, including a head of the person and other body parts, the input image including a distance image having distances to respective points on the surface of a subject,
detects a position of the head of the person in the input image,
determines a relative positional relationship between the head and another body part in the input image with the use of feature amounts extracted from an image region around the detected position of the head, the feature amounts including differences in distance from a background acquired by taking the differences between a background distance image obtained by shooting the background without the person and the distance image,
sets at least one of the direction of searching for a human region and the region of searching for the human region in accordance with the determined relative positional relationship,
detects the human region from the input image,
detects a position of the head of the person is detected based on a distribution of distances extracted from the distance image, and
determines the relative positional relationship from the orientation in which a region having a specific or larger number of pixels with larger values of the distance differences than a predetermined value exists in the image region around the head.

12. The image processing apparatus according to claim 11, wherein the hardware processor searches for feature amounts indicative of the trunk of the person from the feature amounts extracted from the image region around the head, and determines the orientation of the trunk relative to the head as the relative positional relationship.

13. The image processing apparatus according to claim 11, wherein
the hardware processor further detects the size of the head of the person in the input image, and decides the size of the image region around the head from which the feature amounts are to be extracted, depending on the size of the head.

14. The image processing apparatus according to claim 13, wherein the hardware processor detects the human region in the input image with limitation to at least one of the direction of searching for the human region and the region of searching for the human region, depending on at least one of the position of the trunk in the input image obtained by searching, the position of the head in the input image, and the size of the head.

15. The image processing apparatus according to claim 11, wherein
the relative positional relationship includes the orientation of the human body indicative of the orientation of another body part relative to the head in the input image, and
the hardware processor performs matching process while rotating one of a template for use in search for the human region and the input image depending on the orientation of the human body, and detects the human region in the input image.

16. An image processing apparatus comprising:
a hardware processor that:
receives an input image of a person, including a head of the person and other body parts,
detects a position of the head of a person in the input image,
determines a relative positional relationship between the head and another body part in the input image with the use of feature amounts extracted from an image region around the detected position of the head, the feature amounts including edge information extracted from the input image, sets at least one of the direction of searching for a human region and the region of searching for the human region in accordance with the determined relative positional relationship, and detects the human region from the input image, wherein the detected relative positional relationship is determined from the orientation in which two parallel edges exist in the edge information in the image region around the detected position of the head.

17. The image processing apparatus according to claim 16, wherein the hardware processor searches for feature amounts indicative of the trunk of the person from the feature amounts extracted from the image region around the head, and determines the orientation of the trunk relative to the head as the relative positional relationship.

18. The image processing apparatus according to claim 16, wherein the hardware processor further detects the size of the head of the person in the input image, and decides the size of the image region around the head from which the feature amounts are to be extracted, depending on the size of the head.

19. The image processing apparatus according to claim 18, wherein the hardware processor detects the human region in the input image with limitation to at least one of the direction of searching for the human region and the region of searching for the human region, depending on at least one of the position of the trunk in the input image obtained by searching, the position of the head in the input image, and the size of the head.

20. The image processing apparatus according to claim 16, wherein the relative positional relationship includes the orientation of the human body indicative of the orientation of another body part relative to the head in the input image, and the hardware processor performs matching process while rotating one of a template for use in search for the human region and the input image depending on the orientation of the human body, and detects the human region in the input image.

* * * * *